Oct. 13, 1925.

C. VAN RENNES

ELECTRICAL APPARATUS

Filed Nov. 24, 1923

1,557,221

Inventor
Cornelis Van Rennes
By Spencer, Sewall & Hardman
His Attorneys

Patented Oct. 13, 1925.

1,557,221

UNITED STATES PATENT OFFICE.

CORNELIS VAN RENNES, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed November 24, 1923. Serial No. 676,826.

*To all whom it may concern:*

Be it known that I, CORNELIS VAN RENNES, a citizen of the United States of America, residing at Dayton, county of Montgomery, State of Ohio, have invented certain new and useful Improvements in Electrical Apparatus, of which the following is a full, clear, and exact description.

This invention relates to electric motors and has for its object to cause the motor to operate in either direction of rotation by mechanism which can be housed within the motor frame, and which is durable and reliable.

In the form of the invention shown herein there is provided a set of commutator brushes, diametrically opposite each other but offset from the neutral point on the commutator. The brushes are adapted for rotation through friction with the commutator for reversing the polarity of the armature and thereby effecting reversal of the motor. Means are also provided for holding the brushes against rotation or for permitting limited rotation thereof in one direction to reverse the motor, and then for preventing movement of the brushes in the opposite direction when the motor is reversed.

Further objects and advantages of the present invention will be apparent from the following description, reference being had to the accompanying drawings, wherein a preferred embodiment of one form of the present invention is clearly shown.

Figures 1, 2:
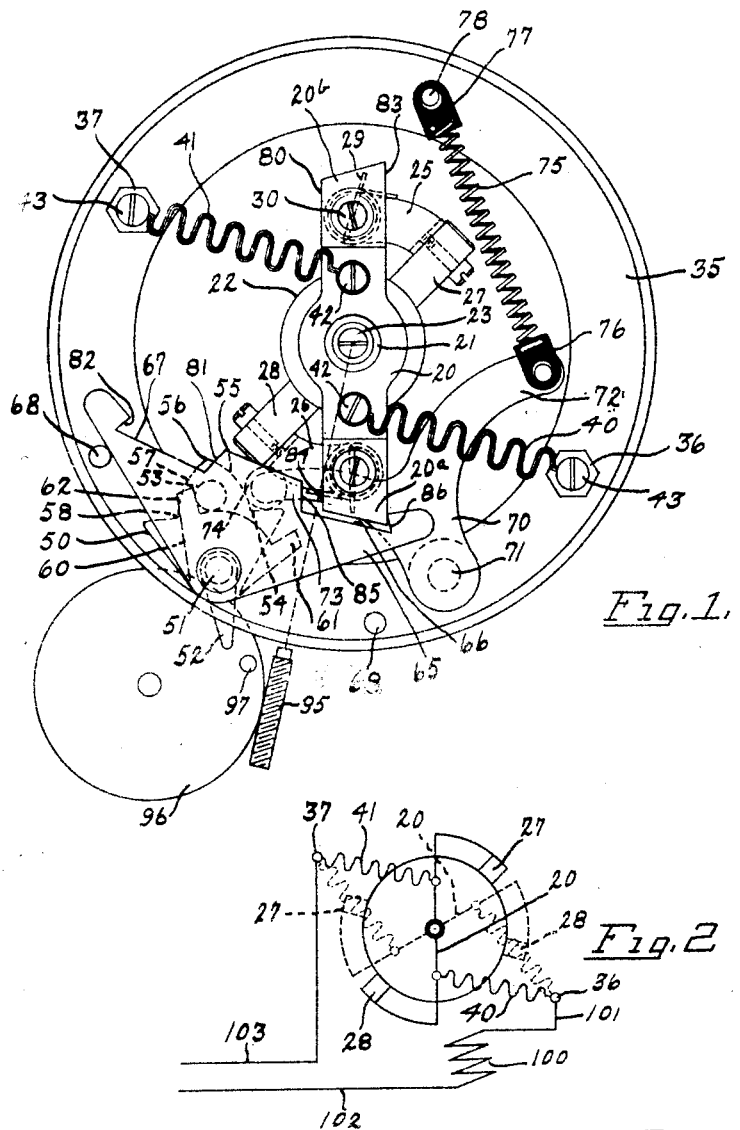
Fig. 1 is a diagrammatic end view of a motor embodying the present invention.
Fig. 2 is a wiring diagram of the circuit connections employed in the disclosed form of the invention.

Referring to the drawings, a brush holder plate 20 is rotatably mounted on motor shaft 21 and is held adjacent commutator 22, by a screw 23 threaded into shaft 21. The ends of brush holder plate 20 support pivotally mounted conducting brush arms 25 and 26 which carry commutator brushes 27 and 28 respectively diametrically opposite but offset from the neutral point on commutator 22. Arms 25 and 26 are insulated from plate 20. Brushes 27 and 28 are yieldingly maintained in engagement with the commutator 22 by coil spring 29, one end of which passes through holes in the screws 30 which secure brush arms 25 and 26 to the brush holder plate 20, the other ends of said spring bearing against the arms 25 and 26. A supporting plate 35, which is adapted to be attached to the frame of a motor, carries terminals 36 and 37 which are insulated from each other. Terminal 36 is connected to one end of a motor field winding 100 (see Fig. 2) by wire 101, the other end of said winding being connected with a suitable source of current by wire 102. Terminal 37 is connected to the source of current by wire 103. Flexible conductors 40 and 41, which are connected with plate 20 by screws 42 insulated from plate 20 are also connected with terminals 36 and 37 respectively by screws 43. One screw 42 is electrically connected with brush arm 25, and the other with brush arm 26.

An acorn shaped cam 50 is mounted on shaft 51 carried by supporting plate 35 and secured thereto is a lever 52. A worm 95, secured to motor shaft 21, cooperates with a worm gear 96 which is mounted in any suitable manner. A lug 97 carried by the worm gear 96 is adapted to engage lever 52, thereby moving the cam 50 in opposite directions upon reversal of the motor. Cam 50 carries a stud 53 which cooperates with a plate 60 having fingers 61 and 62 and secured to the under side of a triangular-shaped latch plate 65 which is loosely pivoted on shaft 51. Latch plate 65 is provided with notches 66 and 67 which are adapted to receive the stop portions 20$^a$ and 20$^b$ respectively of plate 20 for preventing rotation thereof. Stud 68 carried by plate 35 limits the movement of latch plate 65 in either direction.

A retaining pawl 70, pivoted on plate 35 at 71, is provided with curved branches 72 and 73, branch 73 carrying a roller 74 adjacent its extremity. A spring 75, to the ends of which are attached insulating clips 76 and 77, connects branch 72 with a stud 78 carried by plate 35. Spring 75 tends yieldingly to maintain roller 74 in contact with the camming surfaces of acorn shaped cam 50.

*Mode of operation.*

Assuming that the brushes 27 and 28 are in the position shown in Fig. 1, and in the full line position shown in Fig. 2, the circuit will be as follows: From the source of current through wire 102, field 100, wire 101, terminal 36, conductor 40, brush 28, across the motor armature, brush 27, conductor 41, terminal 37, wire 103 back to the source of current. Upon counter-clockwise direction of rotation of worm gear 96, lug 97 will engage lever 52 causing clockwise direction of rotation of cam 50. Roller 74 moves out of notch 54 in cam 50, travels along the surface 55 and slightly past the point 56. Then the spring 75 will cause roller 74 to quickly travel over surface 57 into notch 58. In this manner the latch plate 65 is quickly moved in a clockwise direction of rotation to cause the stud 53, by striking finger 61, to move the latch plate 65 quickly in a clockwise direction of rotation, to release the end 20$^a$ of plate 20. Upon release of the end 20$^a$ of plate 20 from plate 65, the plate 20 will be rotated in a counter-clockwise direction of rotation through friction of brushes 27 and 28 with the commutator 22. Upon such rotation, the latch plate 65, being limited in its movement by a stop 68, will be in such position that notch 67 is in the path of travel of the end 20$^b$ of plate 20, and the edge 80 of plate 20 will engage the stop edge 81 of the latch plate 65 whereupon rotation of plate 20 and brushes 27 and 28 will be stopped. Brushes 27 and 28 will now be in the dotted line position shown in Fig. 2. The movement of the brushes past the neutral point on the commutator 22 to this dotted line position, reverses the polarity of the armature and causes the motor to operate in the opposite direction. However, the hook edge 82 of latch plate 65 engages edge 83 of plate 20 and prevents plate 20 and brushes 27 and 28 from rotating with the commutator 22.

As soon, however, as the direction of rotation of the motor is reversed, the worm gear 96 will be operated in a clockwise direction of rotation, causing lug 97 to engage lever 52 to move acorn shaped cam 50 in a counter-clockwise direction of rotation. The roller 74 will be lifted out of notch 58 and ride on surface 57. The stud 53 comes into engagement with finger 62 on plate 60, and at this time roller 74 has passed the point 56 and has engaged surface 55 of cam 50. Spring 75 then causes roller 74 to quickly travel over surface 55 into notch 54. Pin 53 bearing against finger 62 causes latch plate 65 to be rotated quickly in a counter-clockwise direction until it strikes a stop 68. The stop end 20$^b$ of plate 20 is at the same time released from notch 67, and the plate 20 is rotated in a clockwise direction by friction of brushes 27 and 28 with commutator 22. Notch 66 will be in the path of travel of end 20$^a$ of plate 20, and edge 84 of plate 20 will strike against the stop edge 85 of plate 65, thus holding plate 20 and brushes 27 and 28 against further rotation in a clockwise direction. The reversal of the motor is again effected by this shifting of the brushes, as above described, and the hook edge 86 of plate 65 prevents rotation of plate 20 and brushes 27 and 28 with the commutator, as shown in the drawing.

The lever 52 may be operated manually to cause operation of the latch plate 65, so that the motor can be reversed when desired as well as periodically reversed by operation of means driven by the motor.

While the form of embodiment of the invention as herein disclosed, constitutes a preferred form, it is to be understood that other forms might be adopted, all coming within the scope of the claims which follow.

What is claimed is as follows:

1. Reversing mechanism comprising, in combination, an electric motor having a commutator and a rotatable brush holder carrying commutator brushes and means for maintaining the brushes in frictional engagement with the commutator, a device which in one position prevents rotation of the brush holder in the direction of rotation of the commutator, but is movable to another position for releasing the brush holder to permit the brushes to rotate with the commutator into position for reversing the motor, and then to engage the brush holder to prevent rotation of the same upon reversal of the motor, and vice versa, and means for controlling said device.

2. Reversing mechanism comprising in combination, an electric motor having a commutator and a rotatable brush holder carrying commutator brushes and means for maintaining the brushes in frictional engagement with the commutator, and a pivoted latch plate having portions adapted to be located alternately in the path of motion of the brush holder and to be engaged by the brush holder in order to prevent rotation of the brush holder in the direction of rotation of the commutator, and means for moving the latch plate from one position to the other in order to release the brush holder and permit it to rotate with the commutator into position for reversing the motor, and to cause the latch plate to engage the brush holder to prevent rotation of the brush holder in the reverse direction.

3. Reversing mechanism comprising, in combination, an electric motor having a commutator and brush holder rotatable coaxially of the motor shaft and having arms for engaging stops to limit movement of the brush holder, brushes carried by the holder, means for maintaining the brushes in frictional engagement with the commutator and a pivoted latch plate having hook portions adapted to engage, respectively, the stop portions of the brush holder, and means for moving said plate so that one hook portion disengages a stop portion of the brush holder to permit the brush holder to rotate with the commutator into position for reversing the motor, and so that the other hook portions will be located in the path of the other stop portion to engage the same in order to prevent rotation of the brush holder in the reversed direction.

4. Reversing mechanism comprising, in combination, an electric motor having a commutator and a rotatable brush holder carrying brushes and means for holding the brushes in frictional engagement with the commutator, and means for maintaining the brush holder in a position for causing the motor to rotate in a certain direction, said means being movable to release the brush holder to permit it to move into position for reversing the motor and to re-engage the brush holder to maintain in position for causing the motor to rotate in the opposite direction.

5. Reversing mechanism comprising, in combination, an electric motor, commutator brushes, a rotatable brush holder, means actuated by movement of the motor movable to one position to cause the brush holder to be held stationary against friction between the commutator and the brushes tending to move the brushes in one direction, and movable into another position to first permit the brush holder to rotate with the commutator a limited amount whereby to reverse the direction of rotation of the motor and then for holding the brush holder against rotation in the opposite direction.

6. Reversing mechanism comprising, in combination, an electric motor having a commutator and brushes and means for maintaining the brushes in frictional engagement with the commutator, and means for holding the brushes against rotation with the commutator while the motor rotates in a certain direction, said means being movable to release the brushes whereby the brushes rotate into position for producing reversal of the motor prior to movement of the motor in the reversal direction, and then to prevent rotation of the brushes in the reversed direction of rotation of the motor.

In testimony whereof I hereto affix my signature.

CORNELIS VAN RENNES.